(12) United States Patent
Yi et al.

(10) Patent No.: US 7,923,508 B2
(45) Date of Patent: Apr. 12, 2011

(54) FLAME RETARDANT STYRENE-BASED RESIN COMPOSITION WITH HIGH IMPACT PROPERTY

(75) Inventors: Jin-woo Yi, Yeosu-si (KR); Ki-young Nam, Yeosu-si (KR); Yong-yeon Hwang, Daejoen (KR); Tae-woo Kim, Yeosu-si (KR); Young-shim Kim, Mokpo-si (KR); Chan-hong Lee, Daejeon (KR)

(73) Assignee: LG Chem, Ltd. (KR)

( * ) Notice: Subject to any disclaimer, the term of this patent is extended or adjusted under 35 U.S.C. 154(b) by 1024 days.

(21) Appl. No.: 11/246,648

(22) Filed: Oct. 7, 2005

(65) Prior Publication Data

US 2006/0106141 A1   May 18, 2006

(30) Foreign Application Priority Data

Oct. 7, 2004   (KR) ........................ 10-2004-0080104

(51) Int. Cl.
*C08K 5/02* (2006.01)
*C08K 5/49* (2006.01)
*C08K 5/03* (2006.01)
*C08K 3/22* (2006.01)
*C08L 25/10* (2006.01)
*C08L 51/00* (2006.01)
*C08L 51/04* (2006.01)
*C08L 9/06* (2006.01)

(52) U.S. Cl. .......... 525/86; 524/114; 524/115; 524/371; 524/411; 524/412; 524/409; 524/504; 524/521; 524/525; 524/575; 524/577

(58) Field of Classification Search ................ 524/114, 524/115, 371, 411, 412, 409, 504, 521, 525, 524/575, 577; 525/85
See application file for complete search history.

(56) References Cited

U.S. PATENT DOCUMENTS 5,668,201 A * 9/1997 Chen et al. ................ 524/114

FOREIGN PATENT DOCUMENTS

| | | |
|---|---|---|
| JP | 59-020347 | 2/1984 |
| JP | 59020347 A * | 2/1984 |
| JP | 6-256618 | 9/1994 |
| JP | 07-173401 | 7/1995 |
| JP | 11-29687 | 2/1999 |
| JP | 11-343373 | 12/1999 |
| JP | 11-349758 | 12/1999 |
| JP | 2000-119477 | 4/2000 |
| KR | 2002-0012385 | 2/2002 |
| KR | 2002-0024638 | 4/2002 |
| KR | 2003-0040736 | 5/2003 |
| KR | 10-2004-0036329 | 4/2004 |

* cited by examiner

*Primary Examiner* — Kelechi C Egwim
(74) *Attorney, Agent, or Firm* — Cantor Colburn LLP

(57) ABSTRACT

The present invention relates to a flame retardant styrene-based resin composition with high impact property. The styrene-based resin composition of the present invention comprises 1-30 parts by weight of a flame retardant, 0.5-15 parts by weight of a flame retardant aid and 0.1-15 parts by weight of a styrene-containing graft copolymer per 100 parts by weight of a base resin comprising a rubber-modified styrene-based copolymer and offers high impact property and good rigidity and fluidity, without appearance problem under a variety of processing conditions.

10 Claims, No Drawings

FLAME RETARDANT STYRENE-BASED RESIN COMPOSITION WITH HIGH IMPACT PROPERTY

This application claims the benefit of the filing date of Korean Patent Application No. 10-2004-0080104 filed on Oct. 7, 2004, in the Korean Intellectual Property Office, the disclosure of which is incorporated herein in its entirety by reference.

TECHNICAL FIELD

The present invention relates to a flame retardant styrene-based resin composition with high impact property, more particularly to a flame retardant rubber-modified, styrene-based resin composition maintaining superior rigidity and fluidity, being capable of applied in a variety of fields without appearance problems under a variety of processing conditions and having high impact property.

BACKGROUND ART

Because of superior processing ability, rigidity, electrical property, etc., styrene-based resins are widely used in various industrial fields for office equipments such as personal computers, word processors, printers and copying machines, household appliances such as TVs, VTRs and stereos, electric and electronic equipments, automobile products and other miscellaneous goods. Particularly, the flame retardant styrene-based resin is mainly used for TV housings.

In spite of superior processing ability and physical properties, use of styrene-based resins was accompanied with safety problem because they burn easily. Thus, researches were performed consistently to offer flame retardance to styrene-based resins. Various halogen-based flame retardants, phosphorus-based flame retardants and inorganic flame retardants are added to attain the flame retardance. Up to now, halogen-based flame retardants are used the most widely since they offer superior flame retardance.

Styrene-based resins have been used in many applications because of superior processing ability. With the recent trend of enlargement of household appliances and office equipments and for cost reduction, need of processing of styrene-based resins into thin film is growing. However, conventional flame retardant styrene-based resins are poor in impact resistance and rigidity to satisfy such need. In addition, superior fluidity is needed for the resins for extrusion and processing with better productivity.

The most general method of improving impact resistance of flame retardant styrene-based resins is adding an impact modifier. Currently, a styrene-butadiene block copolymer is used the most widely. Japanese Patent Laid-Open No. 1999-29687 disclosed a method of improving flame retardance and impact strength by adding an ethylene-methyl methacrylate copolymer to a resin. However, there is no mention of comparison with other impact modifiers.

Japanese Patent Laid-Open No. 1999-343373 disclosed a method of improving impact resistance of an impact-resistant polystyrene resin by controlling particle size distribution of the rubber particles of the resin. This method is advantageous in that a polystyrene resin having large rubber particles can be used along with a polystyrene resin having small rubber particles to offer superior impact resistance even after flame retardance treatment. Japanese Patent Laid-Open No. 1994-256618 disclosed a method of adding polyphenylene ether to improve Izod impact strength and falling weight impact strength of a flame retardant resin.

While the conventional methods could attain improvement of Izod impact strength and falling weight impact strength of a flame retardant styrene-based resin to some degree, the problem of reduction of rigidity and fluidity was not solved. Particularly, when an impact modifier is used to process large and complex products, such appearance problems as flow mark tend to occur frequently.

Thus, a flame retardant styrene-based resin with high impact strength capable of improving appearance problem while maintaining good fluidity and rigidity is urgently needed.

DISCLOSURE OF INVENTION

To solve these problems, it is an object of the present invention to provide a flame retardant resin composition capable of improving impact strength without appearance problem and maintaining fluidity and rigidity of a resin.

The object of the present invention can be attained by the present invention as described hereinbelow.

To attain the object, the present invention provides a flame retardant styrene-based resin composition with high impact property comprising 1-30 parts by weight of a flame retardant, 0.5-15 parts by weight of a flame retardant aid and 0.1-15 parts by weight of a styrene-containing graft copolymer per 100 parts by weight of a rubber-modified styrene-based copolymer basic resin.

Hereunder is given a detailed description of the invention.

The flame retardant styrene-based resin composition of the present invention comprises 1-30 parts by weight of at least one flame retardant selected from a group consisting of a halogen compound, a phosphorus-based compound and an epoxy compound; 0.5-15 parts by weight of at least one flame retardant aid selected from a group consisting of an antimony oxide, a zinc compound, barium borate, zirconium oxide, talc and mica and 0.1-15 parts by weight of a styrene-containing graft copolymer per 100 parts by weight of a rubber-modified styrene-based copolymer base resin.

Property, function, composition, etc. of each constituent of the present invention are as follows.

(1) Rubber-Modified Styrene-based Copolymer

The rubber-modified styrene-based copolymer comprises a rubber polymer dispersed in particle form on a matrix composed of a styrene-based polymer. Polymerization can be performed by bulk polymerization, suspension polymerization or emulsion polymerization. Among these, bulk polymerization is preferable. During bulk polymerization, a rubber polymer is dissolved in a styrene-based monomer, the mixture is agitated and then a polymerization initiator is added.

Typically, the styrene-based monomer used to polymerize the rubber-modified styrene-based copolymer is a styrene-based compound. A compound copolymerizable with the styrene-based compound can be used together.

Preferably, the rubber polymer used in the rubber-modified styrene-based copolymer of the present invention is comprised in 3-30 wt %, more preferably in 4-15 wt %, per 100 wt % of the rubber-modified styrene-based copolymer. If the content is below 3 wt %, impact resistance is insufficient. Otherwise, if it exceeds 30 wt %, thermal stability or melt fluidity may decrease and gelation may occur. Preferably, the rubber polymer has a particle size of 0.5-6 μm and a glass transition temperature of −10° C. or lower. If the glass transition temperature is higher than 10° C., impact resistance decreases.

The styrene-based compound may be a nucleus alkyl-substituted styrene such as p-methylstyrene, 2,4-dimethylstyrene and ethylstyrene; or an α-alkyl-substituted styrene such as α-methylstyrene and α-methyl-p-methylstyrene; as well as styrene. The styrene-based compound may be used alone or in combination.

The compound copolymerizable with the styrene-based compound may be a methacrylic acid ester such as methyl methacrylate and ethyl methacrylate; an unsaturated nitrile compound such as acrylonitrile and methacrylonitrile; or maleic anhydride.

The rubber polymer used in the rubber-modified styrene-based copolymer may be a rubber polymer comprising polybutadiene, acrylate or methacrylate, a styrene-butadiene-styrene copolymer, a styrene-butadiene copolymer, polyisoprene, a butadiene-isoprene copolymer or a natural rubber. Preferably, polybutadiene or a styrene-butadiene copolymer is used, and more preferably, polybutadiene is used. The polybutadiene may be low cis polybutadiene, high cis polybutadiene or a mixture thereof.

The styrene-based compound can be prepared into a rubber-modified styrene-based copolymer by grafting it to a conjugated diene-based rubber by a common polymerization method. However, bulk polymerization is preferable. Addition of monomer during polymerization can be performed either by batch addition or by combination of batch addition and continuous addition.

More preferably, the rubber-modified styrene-based copolymer is a high impact butadiene-styrene (HIPS) resin obtained by grafting styrene to a butadiene rubber.

(2) Flame Retardant

In the present invention, a flame retardant is added to a resin to offer flame retardance. The flame retardant may be at least one selected from a group consisting of a halogen compound, a phosphorus-based compound and an epoxy compound.

Examples of the halogen compound are tetrabromobisphenol A (TBBA), a TBAA-based phenoxy resin, a TBBA-based carbonate oligomer, a brominated epoxy oligomer (BEO), octabromodiphenyl oxide, decabromodiphenyl oxide, tribromophenoxyethane, hexabromodiphenoxyethane, decabromodiphenylethane, ethylenebis(tetrabromophthalimide), 2,4,6-tris(2,4,6-tribromophenoxy)-1,3,5-triazine, etc.

Examples of the phosphorus-based compound are tirphenylphosphate, tri(hydroxyphenyl)phosphate, tricresylphosphate, etc.

And, preferably, the epoxy compound is a brominated epoxy oligomer epoxy terminal group of which is substituted with tribromophenol. More preferably, it is an epoxy oligomer represented by the following formula 1 having a molecular weight ranging from 500 to 4000:

(1)

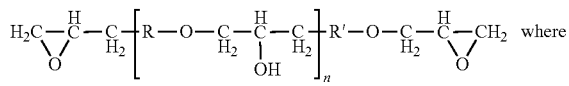

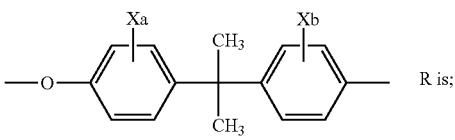 R is;

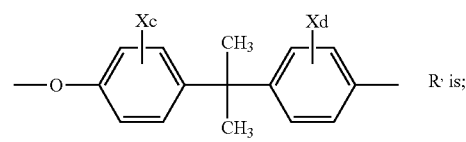 R' is;

X is Br or Cl;
a, b, c and d are integers of 1 to 4; and
n is an integer of 1 or larger.

In the present invention, the flame retardant is preferably comprised in 1-30 parts by weight. If the content is below 1 part by weight, flame retardance cannot be expected. Otherwise, if it exceeds 30 parts by weight, mechanical property and thermal stability of the resin become poor.

(3) Flame Retardant Aid

The flame retardant aid employed in the present invention may be at least one selected from a group consisting of an antimony oxide, a zinc compound, barium borate, zirconium oxide, talc and mica.

The antimony oxide may be antimony trioxide, antimony tetraoxide, antimony pentaoxide, etc.

The zinc compound may be zinc borate, zinc molybdate, zinc sulfide, etc.

Of these flame retardant aids, antimony trioxide is particularly preferable for an HIPS resin.

In the present invention, the flame retardant aid is preferably comprised in 0.5-15 parts by weight. If the content is below 0.5 part by weight, flame retardance cannot be expected. Otherwise, if it exceeds 15 parts by weight, mechanical property and processing ability of the resin become poor.

(4) Styrene-containing Graft Copolymer

In the present invention, a styrene-containing graft impact modifier offering high impact property without appearance problem under various processing conditions is used. The styrene-containing graft copolymer is a copolymer obtained by grafting styrene in a conjugated diene-based rubber having an average particle diameter or 500-4000 Å. The conjugated diene-based rubber polymerization and styrene grafting can be performed by bulk polymerization, suspension polymerization or emulsion polymerization. Among them, emulsion polymerization is preferable.

The styrene-containing graft copolymer offers high impact property to the rubber-modified styrene-based resin. In general, flame retardant resin compositions to lose impact resistance of the base resin as flame retardant and flame retardant aid are added. A lot of impact modifiers are used to solve this problem, but in that case, such important properties of the rubber-modified styrene-based resin as rigidity, fluidity and thermal stability become poor. The styrene-butadiene block copolymer, which is currently used the most widely, is advantageous in improving Izod impact strength and falling weight impact strength. But, it has poor rigidity and fluidity and flow mark occurs at the surface because of the linear, branched or radial molecular structure, which impairs appearance. Especially, when processed at high temperature or involved with complex structure, the flow mark problem becomes severe.

In the styrene-containing graft copolymer of the present invention, content of the rubber polymer with controlled average particle diameter is increased and styrene is grafted to improve impact resistance of the rubber-modified styrene-based copolymer. Particularly, it has very superior dispersibility despite very high rubber polymer content in the styrene-containing graft copolymer since particle diameter of the rubber is controlled to 500-4000 Å. Accordingly, maximum impact strength can be attained with little content, with minimum effect on fluidity of the base resin. In addition, because the rubber particles are fine, rigidity of the base resin is not reduced, and because the rubber particles are spherical and have controlled particle size distribution, good appearance can be obtained under a variety of processing conditions.

In the styrene-containing graft copolymer, the rubber polymer is typically prepared by emulsion polymerization. 100 parts by weight of a conjugated diene compound monomer, 0.5-2.5 parts by weight of an emulsifier, 0.2-1.5 parts by weight of a polymerization initiator, 0.2-1.0 part by weight of an electrolyte, 0-0.5 part by weight of a molecular weight controller and 75-100 parts by weight of ion exchange water are fed for polymerization. Reaction is terminated by adding a polymerization inhibitor.

The conjugated diene compound may be 1,3-butadiene, isoprene, chloroprene, pyperylene, or a comonomer thereof. Among them, 1,3-butadiene is preferable.

Styrene is grafted with 50-90 wt % of the resultant rubber polymer to obtain the styrene-containing graft copolymer, typically by emulsion polymerization. 10-50 wt % of styrene can be fed at once or separately. 0.5-3.0 parts by weight of an emulsifier and 0.05-1.0 parts by weight of an initiator are used for stable emulsion polymerization and initiation.

For the styrene to be grafted, nucleus alkyl-substituted styrene such as p-methylstyrene, 2,4-dimethylstyrene and ethylstyrene; or α-alkyl-substituted styrene such as α-methylstyrene and α-methyl-p-methylstyrene may be used, as well as styrene. The styrene compound may be used alone or in combination.

Preferably, average rubber particle diameter and content of the rubber polymer in the styrene-containing graft copolymer are 500-4000 Å and 50-90 wt %, respectively. If the particle diameter is smaller than 500 Å and the rubber content is below 50 wt %, improvement in impact strength is slight. Otherwise, if the particle diameter is larger than 4000 Å and the rubber content exceeds 90 wt %, rigidity of the resin becomes poor. More preferably, the particle diameter is 2000 Å and the rubber content is 70 wt %. Preferably, content of the styrene-containing graft copolymer is 0.1-15 parts by weight per 100 parts by weight of the rubber-modified styrene-based copolymer. If the content is below 0.1 part by weight, effect of the invention is slight. Otherwise, if it exceeds 15 parts by weight, rigidity and fluidity worsen.

(5) Additives

The flame retardant styrene-based resin composition of the present invention may further comprise at least one additive selected from a group consisting of a lubricant, a heat stabilizer, an antioxidant, a photostabilizer, an antidripping agent, a pigment and an inorganic filler, depending on application.

BEST MODE FOR CARRYING OUT THE INVENTION

Hereinafter, the present invention is described further in detail through examples. However, the following examples are only for the understanding of the invention and the invention is not limited to or by them.

EXAMPLES

Example 1

A mixture solution of 7.0 parts by weight of high cis polybutadiene having an average rubber particle diameter of 5 μm, 73.9 parts by weight of styrene monomer, 19.07 parts by weight of ethylbenzene and 0.03 part by weight of t-butylperoxyisopropyl carbonate, an initiator, was continuously fed, while performing polymerization. The first reactor was operated at 85 rpm and 126° C., the second reactor, at 20 rpm and 138° C., the third reactor at 15 rpm and 150° C. and the fourth reactor at 8 rpm and 155° C. Polymerization solution coming out of the final reactor was passed through a two-step devolatilization apparatus to remove unreacted monomer and solvent. 0.1 part by weight of liquid paraffin having a viscosity of 100 cst was added at the entrance of the two-step devolatilization apparatus. The solution passing through the devolatilization apparatus was pelletized with an extruder to obtain rubber-modified styrene-based copolymer (HIPS1).

The rubber polymer of styrene-containing graft copolymer (SB1) was prepared by reacting 75 parts by weight of 1,3-butadiene, as monomer, 1.0 part by weight of sodium dodecylbenzenesulfonate and 1.5 parts by weight of potassium oleate, as emulsifier, 0.2 part by weight of potassium persulfate and 1.0 part by weight of potassium carbonate, as initiator, 0.2 parts by weight of tert-dodecylmercaptan, as molecular weight controller, and 100 parts by weight of ion exchange water, which were fed at once or separately, for 4-15 hours at 65-75° C., and then performing reaction at 70-85° C. for 10-20 hours after feeding a conjugated diene compound monomer and a molecular weight controller at once or continuously (separately). The average rubber particle diameter of the rubber polymer was adjusted to 2000 Å by controlling contents of the emulsifier, initiator and electrolyte and polymerization time. When the polymerization transition ratio reached 80-95%, a polymerization inhibitor was added to terminate polymerization.

Styrene was grafted with 70 wt % of the resultant rubber polymer to obtain the styrene-containing graft copolymer. 30 wt % of styrene was fed at once or separately. 0.3 part by weight of potassium oleate, an emulsifier, 0.1 part by weight of t-butyl hydroperoxide, an initiator, etc. were used to stabilize emulsion polymerization and induce initiation. To the resultant styrene-containing graft copolymer were added 1 part by weight of sulfuric acid, a flocculant, and 1.5 part by weight of IR-245, an anti-oxidant, to obtain a solid product, which was dried to obtain a powder.

100 parts by weight of the resultant rubber-modified styrene-based copolymer (HIPS1), 3 parts by weight of a styrene-containing graft copolymer (SB1), 24 parts by weight of a brominated epoxy oligomer (BEO), a flame retardant, 3 parts by weight of antimony trioxide ($Sb_2O_3$), a flame retardant aid, 1 part by weight of an antioxidant, 1 part by weight of a photostabilizer and 1 part by weight of a lubricant were mixed homogeneously using a mixer and prepared into a styrene-based resin composition in a pellet form using a twin screw extruder.

The resultant pellet was injection molded to fabricate a test sample. Physical properties were tested as follows.

Izod impact strength: Tested with a ⅛-inch notch sample according to ASTM D256.

Fluidity (MFR): Tested at 200° C. with a load of 5 kg according to ASTM D1238.

Tensile strength (TS): Tested at 5 cm/min according to ASTM D638.

Flexural strength (FS): Tested at 1.5 cm/min according to ASTM D790.

Falling weight impact strength (FD): Tested with a square sample having a thickness of 3.2 mm and a width of 80 mm according to ASTM D3763. A falling weight weighing 3.729 kg and having a diameter of 12.5 mm was used. The falling weight was dropped at a height of 30 cm and energy absorption was measured when the first cracking occurred.

Appearance (FM): The resin was kept in an injection molder of 250° C. for 15 minutes. Presence of surface flow mark was observed with naked eyes. Evaluation standard: ⊚=superior; ○=moderate; Δ=poor.

Flame retardance: Tested for a thickness of 1/16 inch according to the vertical test method of UL-94.

Examples 2 and 3

1 and 5 parts by weight of styrene-containing graft copolymer were added, respectively, to prepare resins in the same manner of Example 1, with the contents given in Table 1 below. Physical property test result is given in Table 3 below.

Examples 4-6

3 parts by weight of a styrene-containing graft copolymer (SB2) having an average rubber particle diameter of 500 Å and a rubber content of 70 wt %, 3 parts by weight of a styrene-containing graft copolymer (SB3) having an average particle diameter 2000 Å and a rubber content of 50 wt % and 3 parts by weight of a styrene-containing graft copolymer (SB4) having an average particle diameter of 4000 Å and a rubber content of 70 wt % were added, respectively, to prepare resins in the same manner of Example 1, with the contents given in Table 2. Physical property test result is given in Table 4 below.

Comparative Examples 1-5

Resins were prepared in the same manner of Example 1, with the contents given in Table 1, without using a styrene-containing graft copolymer (Comparative Example 1), using 1 and 3 parts by weight of Tufprene 125 (Asahi, Japan), a block copolymer (SBS) comprising styrene- and olefin-based elastomer (respectively in Comparative Examples 2 and 3), and using 1 and 3 parts by weight of Tuftec H1031 (Asahi, Japan), a block copolymer (SEBS) comprising styrene- and olefin-based elastomer, or a hydrogenated block copolymer of Tufprene 125 (respectively in Comparative Examples 4 and 5). Physical property test result is given in Table 3.

TABLE 1

| Classi-fication | Examples | | | Comparative Examples | | | | |
|---|---|---|---|---|---|---|---|---|
| | 1 | 2 | 3 | 1 | 2 | 3 | 4 | 5 |
| Com-position HIPS | 100 | 100 | 100 | 100 | 100 | 100 | 100 | 100 |
| BEO | 24 | 24 | 24 | 24 | 24 | 24 | 24 | 24 |
| $Sb_2O_3$ | 3 | 3 | 3 | 3 | 3 | 3 | 3 | 3 |
| SB1 | 3 | 1 | 5 | — | — | — | — | — |
| SBS | — | — | — | — | 1 | 3 | — | — |
| SEBS | — | — | — | — | — | — | 1 | 3 |
| Others | 3 | 3 | 3 | 3 | 3 | 3 | 3 | 3 |

TABLE 2

| | Examples | | |
|---|---|---|---|
| Classification | 4 | 5 | 6 |
| Composition HIPS | 100 | 100 | 100 |
| BEO | 24 | 24 | 24 |
| $Sb_2O_3$ | 3 | 3 | 3 |
| SB2 | 3 | — | — |
| SB3 | — | 3 | — |
| SB4 | — | — | 3 |

TABLE 3

| Physical properties | Examples | | | Comparative Examples | | | | |
|---|---|---|---|---|---|---|---|---|
| | 1 | 2 | 3 | 1 | 2 | 3 | 4 | 5 |
| Izod impact strength (1/8") | 9.5 | 9.0 | 9.9 | 7.2 | 8.8 | 9.7 | 9.1 | 9.8 |
| MFR | 14.1 | 14.3 | 14.1 | 14.4 | 14.3 | 14.3 | 13.9 | 13.4 |
| TS | 291 | 299 | 279 | 310 | 295 | 294 | 295 | 294 |
| FS | 490 | 498 | 435 | 511 | 499 | 494 | 496 | 495 |
| FD | 7.4 | 6.9 | 8.5 | 5.5 | 7.0 | 7.5 | 7.0 | 7.4 |

TABLE 3-continued

| Physical properties | Examples | | | Comparative Examples | | | | |
|---|---|---|---|---|---|---|---|---|
| | 1 | 2 | 3 | 1 | 2 | 3 | 4 | 5 |
| Appearance (FM) | ◉ | ◉ | ◉ | ◉ | ○ | △ | △ | △ |
| Flame retardance | V-0 | V-0 | V-0 | V-0 | V-0 | V-0 | V-0 | V-0 |

TABLE 4

| Physical properties | Examples | | |
|---|---|---|---|
| | 4 | 5 | 6 |
| Izod impact strength (1/8") | 8.1 | 7.9 | 10.7 |
| MFR | 11.5 | 14.4 | 13.9 |
| TS | 300 | 302 | 260 |
| FS | 501 | 505 | 421 |
| FD | 6.6 | 6.5 | 8.3 |
| Appearance (FM) | ◉ | ◉ | ○ |
| Flame retardance | V-0 | V-0 | V-0 |

As seen in Table 3, Examples 1-3 show high impact property with rigidity, fluidity and appearance comparable to those of Comparative Example 1. Although Comparative Examples 2-5 shows high impact property, it shows poor appearance with flow marks. Particularly, the appearance becomes worse as the contents of SBS and SEBS increase.

As seen in Table 4, for Examples 4-6 (in which the compositions were prepared in the same manner of Example 1 with the average rubber particle diameter and rubber content controlled), it can be seen that the preferable average rubber particle diameter and content are 500-4000 Å and 50-90 wt %, respectively. If the particle diameter is smaller than 500 Å and the rubber content is below 50 wt %, improvement of impact strength is slight. Otherwise, if they exceed 4000 Å and 90 wt %, respectively, rigidity of the resin is poor.

INDUSTRIAL APPLICABILITY

As described above, the flame retardant styrene-based resin composition of the present invention, which is prepared by adding a flame retardant, a flame retardant aid and a styrene-containing graft copolymer to a rubber-modified styrene-based copolymer, has high impact property and good rigidity and fluidity, without appearance problem under a variety of processing conditions.

While the present invention has been described in detail with reference to the preferred embodiments, those skilled in the art will appreciate that various modifications and substitutions can be made thereto without departing from the spirit and scope of the invention as set forth in the appended claims.

The invention claimed is:

1. A flame retardant styrene-based resin composition with high impact property comprising:
   100 parts by weight of a rubber-modified styrene-based copolymer base resin;
   1-30 parts by weight of a flame retardant;
   0.5-15 parts by weight of a flame retardant aid; and
   0.1-15 parts by weight of a styrene-containing graft copolymer,
   wherein the rubber-modified styrene-based copolymer base resin consists essentially of a matrix of polystyrene and a rubber polymer particle dispersed in the matrix of polystyrene; and the styrene-containing graft copolymer is a styrene-conjugated diene graft copolymer in which only styrene is grafted to 50 to 90% by weight of a conjugated diene rubber having an average particle diameter of 500-4000 Å, based on the total weight of styrene-conjugated diene graft copolymer.

2. The resin composition of claim 1, the flame retardant being at least one selected from a group consisting of a halogen compound, a phosphorus-based compound and an epoxy compound.

3. The resin composition of claim 2, the halogen compound being at least one selected from a group consisting of tetrabromobisphenol A (TBBA), TBBA-based phenoxy resin, TBBA-based carbonate oligomer, brominated epoxy oligomer, octabromodiphenyl oxide, decabromodiphenyl oxide, tribromophenoxyethane, hexabromodiphenoxyethane, decabromodiphenylethane, ethylenebis(tetrabromophthalimide), and 2,4,6-tris(2,4,6-tribromophenoxy)-1,3,5-triazine.

4. The resin composition of claim 2, the phosphorus-based compound being at least one selected from a group consisting of triphenyl phosphate, tri(hydroxyphenyl) phosphate and tricresyl phosphate.

5. The resin composition of claim 2, the epoxy compound being a brominated epoxy oligomer the epoxy terminal group of which is substituted with tribromophenol.

6. The resin composition of claim 2, the epoxy compound having a molecular weight of 500-4000 and being represented by the following formula 1:

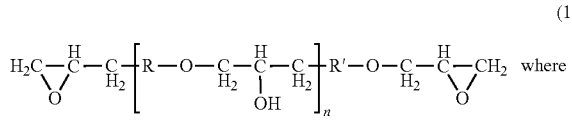 (1)

where

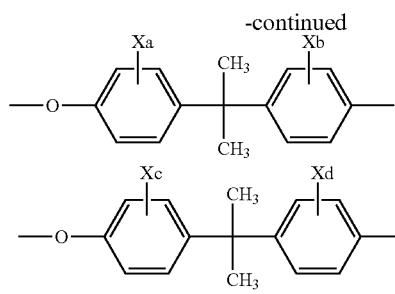

X is Br or Cl;

a, b, c and d are integers of 1 to 4; and n is an integer of 1 or larger.

7. The resin composition of claim 1, the flame retardant aid being at least one selected from a group consisting of an antimony oxide, a zinc compound, barium borate, zirconium oxide, talc and mica.

8. The resin composition of claim 7, the antimony oxide being at least one selected from a group consisting of antimony trioxide, antimony tetraoxide and antimony pentaoxide.

9. The resin composition of claim 7, the zinc compound being at least one selected from a group consisting of zinc borate, zinc molybdate and zinc sulfide.

10. The resin composition of claim 1 further comprising at least one additive selected from a group consisting of a lubricant, a heat stabilizer, an antioxidant, a photostabilizer, an antidripping agent, a pigment and an inorganic filler.

* * * * *